(12) United States Patent
Maldonado et al.

(10) Patent No.: US 11,618,122 B1
(45) Date of Patent: Apr. 4, 2023

(54) METHODS AND APPARATUS FOR GENERATING FREE-FORM OPTICAL COMPONENTS

(71) Applicant: RAYTHEON COMPANY, Waltham, MA (US)

(72) Inventors: Alejandro Maldonado, Tucson, AZ (US); David J. Knapp, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 1062 days.

(21) Appl. No.: 16/296,506

(22) Filed: Mar. 8, 2019

(51) Int. Cl.
| | |
|---|---|
| B24B 13/06 | (2006.01) |
| B24B 13/00 | (2006.01) |
| B24B 49/02 | (2006.01) |
| B24B 49/04 | (2006.01) |
| G02C 7/00 | (2006.01) |

(52) U.S. Cl.
CPC .............. *B24B 13/00* (2013.01); *B24B 13/06* (2013.01); *B24B 49/02* (2013.01); *B24B 49/04* (2013.01); *G02C 7/00* (2013.01)

(58) Field of Classification Search
CPC ............ B24B 13/0006; B24B 13/0012; B24B 13/0018; B24B 13/0025; B24B 13/06; B24B 49/02; B24B 49/04; B24B 49/045; B29C 2059/027; C03C 19/00
USPC ................... 451/9, 10, 11, 42, 277, 384, 390
See application file for complete search history.

(56) References Cited

U.S. PATENT DOCUMENTS

| | | | | |
|---|---|---|---|---|
| 7,828,624 B2* | 11/2010 | Siders | ................. | B24B 13/0057 451/5 |
| 8,882,268 B2* | 11/2014 | Calixte | ................. | G02C 7/061 351/159.77 |
| 8,985,767 B2* | 3/2015 | Spratt | ...................... | A61B 3/00 351/159.06 |
| 2013/0107204 A1* | 5/2013 | Spratt | ...................... | A61B 3/00 351/159.74 |
| 2014/0329443 A1* | 11/2014 | Savoie | .................... | B24B 9/146 451/390 |
| 2016/0114542 A1* | 4/2016 | Quere | .................... | B33Y 10/00 425/104 |

FOREIGN PATENT DOCUMENTS

| | | | | |
|---|---|---|---|---|
| CN | 111372724 A | * | 7/2020 | ......... B24B 13/0037 |
| JP | 2006312233 A | * | 11/2006 | ............... B23B 5/40 |

* cited by examiner

*Primary Examiner* — Eileen P Morgan
(74) *Attorney, Agent, or Firm* — Lando & Anastasi, LLP

(57) ABSTRACT

Examples are directed to an approach to specifying design guidelines for fabricating a free-form optical component, and methods of fabricating the free-form optical components. In one example, a family of optical prescriptions is created, and a fabricator may manufacture the free-form optical element to any selected prescription within the family. According to certain examples, the series of prescriptions in the family each describe a very similar optical surface providing the same or similar optical performance, and are layered relative to one another such that the thickness of the optical element at any point is slightly less for each subsequent surface defined by the next prescription in the series.

7 Claims, 4 Drawing Sheets

| XY POLYNOMIAL TERMS | COEFFICIENT (SURFACE A) | COEFFICIENT (SURFACE B) | COEFFICIENT (SURFACE C) |
| --- | --- | --- | --- |
| X | 1.399078179 | B1 | C1 |
| Y | 1.283691575 | B2 | C2 |
| X^2 | -0.451343786 | B3 | C3 |
| X * Y | 0.381829159 | B4 | C4 |
| Y^2 | 1.042859852 | B5 | C5 |
| X^3 | -0.153940455 | B6 | C6 |
| X^2 * Y | -0.017268822 | B7 | C7 |
| X * Y^2 | -0.448915574 | B8 | C8 |
| Y^3 | 0.169453195 | B9 | C9 |
| X^4 | -0.011486952 | B10 | C10 |
| X^3 * Y | 0.330291061 | B11 | C11 |
| X^2 * Y^2 | 0.297022173 | B12 | C12 |
| X * Y^3 | 0.695433396 | B13 | C13 |
| Y^4 | | B14 | C14 |

FIG. 2

METHODS AND APPARATUS FOR GENERATING FREE-FORM OPTICAL COMPONENTS

BACKGROUND

The use of free-form optical elements continues to become more prevalent in many optical designs because these elements can reduce the number of optical elements needed to achieve a given level of performance or provide optical solutions that cannot be achieved with conventional optical elements. Unlike conventional optical elements (such as spherical or cylindrical lenses or mirrors), free-form optical elements cannot be described by simple geometric expressions, but instead have free-flowing surface shapes that are defined by complex polynomials, and their manufacture requires specialized processing equipment. Free-form optical elements are expensive and difficult to make due to their non-traditional shape and the need to produce highly precise complex surfaces. Typically, these elements are made using a deterministic grinding and polishing process involving a series of grinding and polishing steps, with surface measurements taken after each step. This approach tends to cause the fabricator to overshoot the desired surface (i.e., remove too much material from the blank) because it is not known ahead of time how many passes the process will take to converge on the final surface, and some non-zero amount of material must be removed at even the lowest points on the surface after each run. Grinding past the target surface results in a scrap part or reduced clear aperture. Consequently, convergence in polish-measure-polish cycles is slow in order to reduce the risk or amount of overshoot. It is not uncommon for a fabricator to take weeks or months to produce a single specified free-form optical element. As a result, despite the many benefits afforded by free-form optical elements, the ability to use them in optical systems is limited due to the time and expense involved in the manufacture.

SUMMARY OF INVENTION

Aspects and embodiments are directed to a process for free-form optical component design and fabrication that may reduce the difficulty, time, and cost associated with producing these parts, and thereby increase the ability to fabricate more complex free-form optical components and to incorporate free-form optical components into more optical systems. As discussed in more detail below, certain aspects solve a prevalent problem in free-form optical fabrication where a vendor is unable to make a component to a given prescription by providing a family of prescriptions that work for the same optical system. This approach may make more free-form optical components possible to design and fabricate, and is applicable across the optics industry. In addition, using the processes described herein may reduce the cost of manufacture of free-form optical components and improve the lead times associated with obtaining these components for an optical system.

According to one embodiment, a method of fabricating a free-form optical component comprises receiving a set of optical prescriptions specifying a plurality of variations of a surface figure of the free-form optical component, the set of optical prescriptions including a target optical prescription and a series of additional optical prescriptions, each optical prescription in the set corresponding to one of the plurality of variations of the surface figure of the free-form optical component, processing an article by a plurality of material removal steps to work the article to approach a variation of the surface figure of the free-form optical component specified by the target optical prescription, and measuring characteristics of the article to obtain first surface measurement data for the article, comparing the first surface measurement data to the variation of the surface figure of the free-form optical component specified by the target optical prescription. The method further comprises, responsive to determining, based on the comparing, that the article does not meet specifications of the target optical prescription, selecting an additional optical prescription from the series of additional optical prescriptions, and processing the article by one or more further material removal steps to work the article to approach a variation of the surface figure of the free-form optical component specified by the selected additional optical prescription.

In one example, measuring the characteristics of the article includes measuring a thickness of the article at a plurality of points along a surface of the article. In another example, determining that the article does not meet the specifications of the target optical prescription includes determining that the thickness of the article at one of the plurality of points along the surface of the article is thinner than a minimum thickness set by the target optical prescription. In one example, each additional optical prescription in the series of additional optical prescriptions defines a variation of the free-form optical component that is thinner than a variation of the free-form optical component defined by the target optical prescription.

In one example, the method further comprises after processing the article by the one or more further material removal steps, measuring the characteristics of the article to obtain second surface measurement data for the article, and comparing the second surface measurement data to the variation of the surface figure of the free-form optical component specified by the selected additional optical prescription. In another example, measuring the characteristics of the article includes measuring a thickness of the article at a plurality of points along a surface of the article.

In one example, processing the article by a plurality of material removal steps includes grinding and polishing the article.

According to another embodiment, a method of generating a specification for a free-form optical component comprises generating a target optical prescription defining a target surface figure and a target thickness profile for the free-form optical component, the target optical prescription including a plurality of polynomial coefficients that define the target surface figure relative to an original vertex position, selecting a number of a plurality of family optical prescriptions to be produced, each family optical prescription defining a variation of the target surface figure and a variation of the target thickness profile of the free-form optical component, setting a vertex position step value, and specifying a minimum thickness of the free-form optical component. The method further comprises generating the plurality of family optical prescriptions, each family optical prescription including a plurality of polynomial coefficients that define the variation of the target surface figure relative to an offset vertex position corresponding to the original vertex position offset by a respective integer multiple of the vertex position step value, and each family optical prescription defining the variation of the target thickness profile equal to or exceeding the minimum thickness, and producing a computer file including the specification for the free-form optical component, the specification including information corresponding to the target optical prescription and each of the plurality of family optical prescriptions.

In one example, specifying the minimum thickness of the free-form optical component includes specifying a minimum thickness profile of the free-form optical component that defines the minimum thickness at a plurality of points along a surface of the free-form optical component.

In another example, each family optical prescription defines a variation of the target thickness profile that is thinner than the target thickness profile.

In one example, the vertex position step value is 10 micrometers.

In another example, selecting the number of a plurality of family optical prescriptions to be produced includes selecting 3-8 family optical prescriptions to be produced.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2 is a table illustrating a representative example of a family of optical prescriptions according to aspects of the present invention;

DETAILED DESCRIPTION

Figure 1:
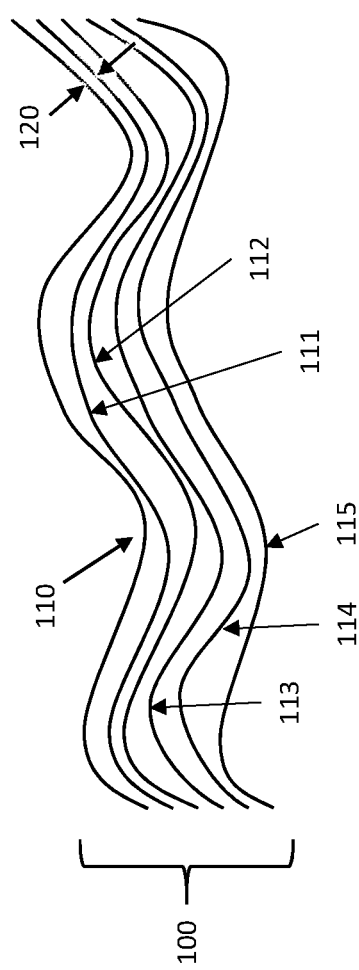
FIG. 1 is a diagram illustrating a family of free-form optical surfaces corresponding to a family of optical prescriptions according to aspects of the present invention.

Free-form optical elements are useful in a wide variety of optical systems and applications. For example, due to the design flexibility and performance offered by free-form optical elements, their use can reduce the number of optical elements needed in an optical system to achieve a given level of performance. This in turn can reduce the size, weight and power (SWAP) requirements of the system, making free-form optical elements an attractive choice for hand-held or wearable optical systems (e.g., helmet-mounted systems for augmented reality) as well as airborne, space-based (e.g., small satellite systems), or other systems where size and weight are important considerations.

Free-form optical components may be particularly relevant for so-called "aero-dome" optical designs, often used in airborne applications, where the optical system includes an optical dome that forms the external aperture or window for the underlying optical system. These domes, and certain other optical components, can be referred to as "conformal" elements because they are designed and configured to match or conform to an existing surface shape, such as an aerodynamic shape specified or defined by the platform on which the optical element or system is to be mounted. In these and similar systems, the underlying optical system is often required to look through steep off-axis sections of surfaces such as ogives, ellipses, and various free-form shapes, that form part of the optical dome. These surface sections can cause significant aberrations in the imaging performance of the optical system, and therefore it is generally desirable to include corrector elements to compensate for the aberrations and improve imaging performance. In these designs an elegant solution to achieving passive optical correction is to use a free-form corrector, sometimes referred to as a "corrector arch." However, as discussed above, these free-form surfaces can be very challenging to fabricate due to their non-traditional shape. In addition, certain conformal optical elements, such as some optical domes, themselves have free-form surface shapes and are therefore also difficult, time-consuming, and expensive to fabricate.

The manufacturing complexity associated with free-form optical components is in part driven by their non-traditional shape. Conventional optical elements, such as spherical or cylindrical lenses or mirrors, for example, can be simply specified in terms of parameters such as thickness and radius of curvature, and have been manufactured with high precision for many years. In contrast, the nominal surface shape for a free-form optical element is defined by complex polynomial equations and typically, free-form optical elements have a non-axisymmetric shape that may include significant surface slope variations. The fabrication process for a free-form optical element begins with a theoretical design model produced using optical ray tracing software. Using design parameters specified by the optical designer, such as the surface shape, the desired optical power at different regions of the surface, characteristics (e.g., refractive index) of the material(s) from the element is to be produced, etc., the software produces a "point file" that describes the optical surface, in mathematical terms, for thousands of points over the surface. The information in this file is used to drive the tools (e.g., a grinding machine and polisher) used to manufacture the optical element.

As discussed above, the manufacture process for a free-form optical element is typically deterministic. Starting with a base piece of material (referred to as a "blank"), series of grinding steps may be performed to achieve the rough surface shape specified for the optical element. The grinding machine has a certain accuracy, and therefore multiple grinding steps, with surface measurements being performed between steps, may be used to slowly form the blank into the desired surface shape, preferably without accidentally removing too much material in any area. The surface measurements are used to compare the surface as it is being formed with the parameter specified in the design file to see how close the article is after each step to the specified target form. A series of polishing steps may also be performed, again with the surface being measured between each step, between and/or after the grinding steps to further smooth and shape the surface. As discussed above, this process can be very slow, and despite the process being meticulously performed using state-of-the-art high precision equipment with small adjustments made in each step, it is still possible that the measurements after any given step will reveal that too much material has been removed, causing the article to fall outside of the design specification. Grinding (or otherwise removing material) past the specified surface thickness results in either a scrap part or reduced clear aperture that compromises the optical performance of the element.

This problem is exacerbated by the need for many free-form optical components to be produced with very high precision. Traditional optical tolerancing attempts to solve fabrication error issues by providing a surface error tolerance on simple optical parameters such as radius of curvature, center thickness, etc. Free-form optical elements may have significantly tighter tolerances than conventional, traditionally-shaped optical elements, driven in part by the complexity of the surface shape and the resulting impact of even small variations in parameters such as thickness, tilt, decenter, etc., on the light rays being refracted or reflected by the surface. For example, the allowable surface figure deviation can be on the order of only 1-10 micrometers ($\mu$m) absolute peak-to-valley deviation. For conventional optical elements, tolerances on thicknesses and radii of curvature can be relatively forgiving in comparison. Even when multiple tolerances on different parameters and aspects of the optical element are combined to ease fabrication, it can be very challenging to meet the design specifications, leading to very high cost and long lead times because manufactures may need to make several attempts before achieving a component that is within the required tolerance range.

Aspects and embodiments are directed to a different approach to specifying the design guidelines for fabricating a free-form optical component that allows the fabricator more flexibility and room for error, reducing manufacturing time and cost. According to certain embodiments, a family of optical prescriptions is created, allowing a fabricator to manufacture the free-form optical element to any prescription within the family, rather than aiming for a single target prescription. According to certain embodiments, the prescriptions in the family each describe a very similar optical surface (and one that achieves the same or very similar optical performance in the optical system for which it is designed, even if the physical characteristics are different), but are "layered" in the sense that the thickness of the optical element at any point is slightly less for each subsequent surface. This allows the fabricator to adapt and select a subsequent one or subsequent ones of the prescriptions in the family during the manufacturing process as the measurements along the way identify which prescription most closely describes the actual part as produced.

FIG. 1 provides an illustration. A family 100 of optical prescriptions describes a plurality of surfaces 110, 111, 112, 113, 114, 115 each defined by a unique optical prescription. As will be appreciated by those skilled in the art, each of the surfaces 110, 111, 112, 114, 115 corresponds to one surface of the free-form optical component. The free-form optical component has some non-zero thickness between the surface shown and an opposing surface, which may have matching shape, some other shape defined by another complex optical prescription, or may be a simple planar or curved surface. The approach and aspects discussed herein may be applied to any one or more surfaces as may be needed to produce a complete free-form optical component. As discussed above, a free-form optical surface is described by complex polynomial equations, and therefore, the optical prescription for each surface includes the coefficients for each polynomial term. FIG. 2 illustrates a portion of table 200 containing a representational example of a family of prescriptions. The first column 210 includes the polynomial terms that correspond to the polynomial equations defining the optical surfaces. In the illustrated example, the terms shown extend to the fourth order; however, as will be appreciated by those skilled in the art, given the benefit of this disclosure, in practice the polynomial terms may extend to the fifth, sixth, seventh, or higher order terms, or may not necessarily extend as high as the fourth order terms. The second column 222 includes an example of the coefficient values corresponding to each polynomial term to define a particular optical surface. The coefficients are relative to a specified starting point or "vertex position" of the corresponding optical surface. The values of the coefficients define the shape of the optical surface, and the vertex position defines the thickness. Those skilled in the art will appreciate that the coefficient values provided in the portion of the table shown in FIG. 2 are illustrative only and not intended to fully describe any particular surface in practice or correspond directly to any of the surfaces shown in FIG. 1. The table of FIG. 2 merely demonstrates the type of information that would be provided by an optical ray tracing software program to define each optical surface in a given family 100. In addition to the table of coefficients, the complete optical prescription for each surface may also specify the vertex position and the material(s), or at least certain parameters thereof (such as refractive index), from which the optical element is to be constructed.

Continuing to refer to FIGS. 1 and 2, in one embodiment, the family 100 of optical prescriptions may include a first or nominal target surface 110. In certain examples, this first surface 110 may correspond to a first column of prescription data in a table such as that shown in FIG. 2 (e.g., the second column 222 for "SURFACE A"). Each subsequent surface 111, 112, 113, 114, 115 in the family may correspond to another column of prescription data in the family table. For example, in FIG. 2 additional columns 224 and 226 for "SURFACE B" and "SURFACE C," respectively, are shown. The example provided in FIG. 2 includes "placeholder" coefficient values (e.g., B1, B2 . . . Bn, and C1, C2 . . . Cn, respectively); however, in practice each of these would a numerical value, similar to as shown in the column 222 for "SURFACE A." A family table 200 may include a column of coefficients for each surface 110, 111, 112, 113, 114, 115 in the family 100. In the example shown in FIG. 1, the family 100 of optical prescriptions includes 6 members; the nominal surface 110 and five subsequent options 111, 112, 113, 114, 115. However, in various embodiments, the family 100 of optical prescriptions may specify any number of surfaces, not limited to six. In some example, the family 100 of optical prescriptions may include 3 to 8 members, for example; however, in other examples, the family 100 may include more or fewer member optical prescriptions.

The free-form optical component has a thickness profile that corresponds to the surface shape specified by the respective optical prescription. As shown in FIG. 1, as and discussed above, each optical surface or prescription in the family 100 corresponds to an optical element that is progressively thinner that the preceding surface/prescription. Thus, in one example, a second optical surface 111 in the family 100 defines an optical element that is thinner than the optical element defined by the first or nominal surface 110 by an amount 120 at any given point along the surface. In certain example, the thickness delta 120 is not a simple static offset, but rather varies from point to point over the surface, as shown in FIG. 1. Thus, the thickness profile of the free-form optical component corresponding to the first surface 110 need not match the thickness profile of the variation of the free-form optical component corresponding to the second surface 111. Similarly, the third surface 112 may be thinner than the second surface 111 by some amount (thickness delta) at all points along the surface, but the thickness profile is also variable, rather than being simply offset from the second surface 111. The same holds for the remaining subsequent surfaces 113, 114, 115 in the family 100. FIG. 1 illustrates a one-dimensional example (the thickness delta is shown to vary over the length of the surfaces in the horizontally drawn dimension); however, in practice the thickness delta ($\Delta$) 120 may vary in two dimensions over the surface areas; i.e., $\Delta=f(x,y)$. As also shown in FIG. 1, the difference in thickness between, for example, the first and second surfaces 110, 111, need not be the same at any given point as the difference in thickness between the second and third surfaces 111, 112, and so on. In some instances, at one or more points, the thickness of the surface defined by one optical prescription in the family 100 may be the same as the thickness of the surface defined by the next (subsequent) optical prescription in the family, but the thickness may not be greater at any point than the thickness prescribed by the preceding optical prescription in the family 100. This is because, as discussed above, the free-form optical elements are produced using material removal processes, such as grinding and polishing, and therefore, during the process the article may only become thinner, not thicker.

Thus, a manufacturer receiving the family 100 of optical prescriptions may begin fabricating the optical element according to the nominal or target surface 110. If during the fabrication process, the measurement data reveals that the article has become too thin at any given point (i.e., is outside of the allowable tolerance range for the first surface 110), the manufacturer may compare the surface shape defined by the measurement data to any one or more of the subsequent surfaces 111-115 in the family 110, and adapt the process to continue to fabricate the optical element now according to the specifications of the prescription corresponding to a new selected surface from the family. This adaption can be repeated, if necessary, allowing the manufacturer the flexibility to adapt a given optical element during the fabrication process to compensate for an error (i.e., too much material removed) that otherwise would have rendered the part out-of-specification and potentially useless.

Figure 3:
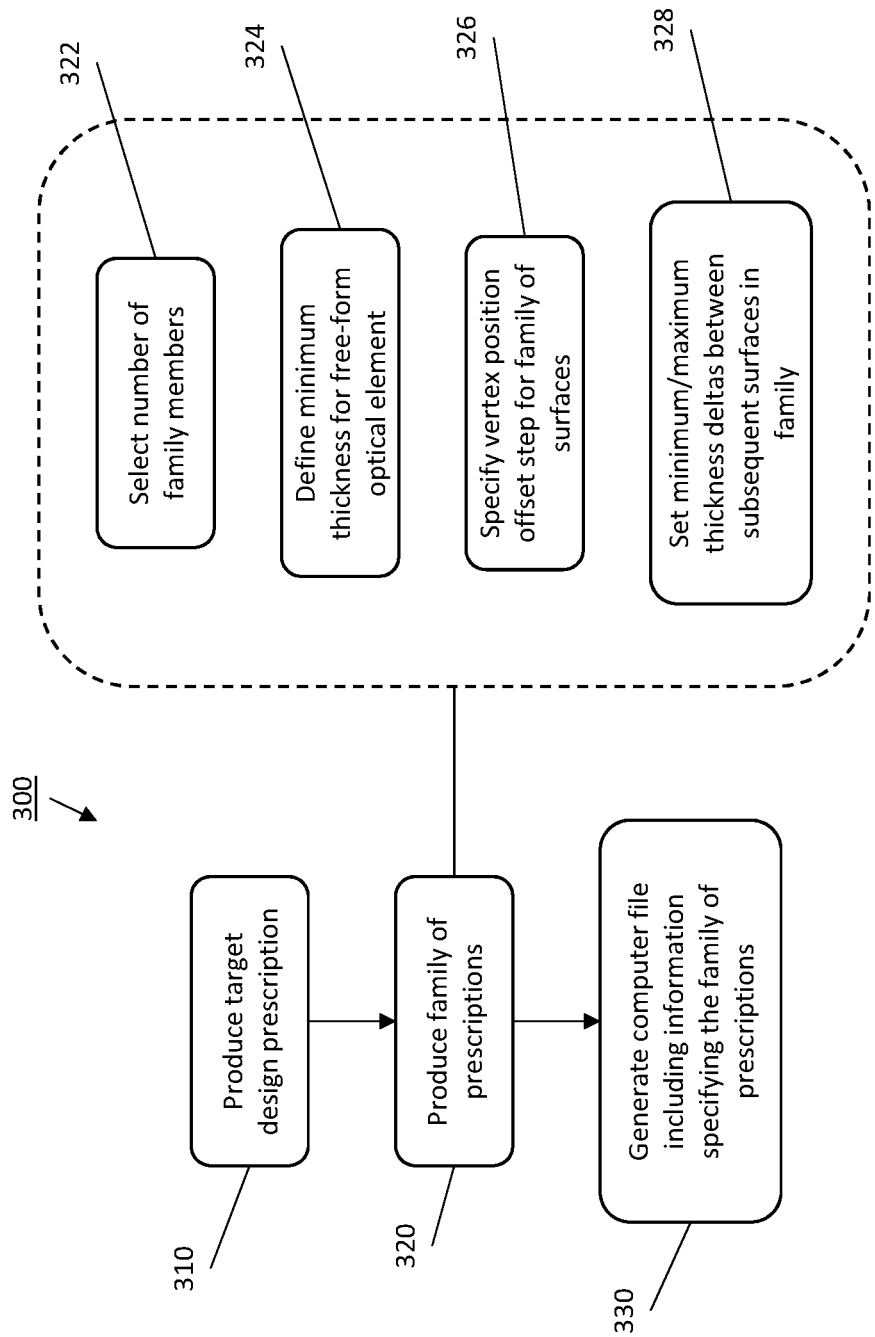
FIG. 3 is a flow diagram illustrating aspects of an example of processes for producing free-form optical components according to aspects of the present invention.
Figure 4:
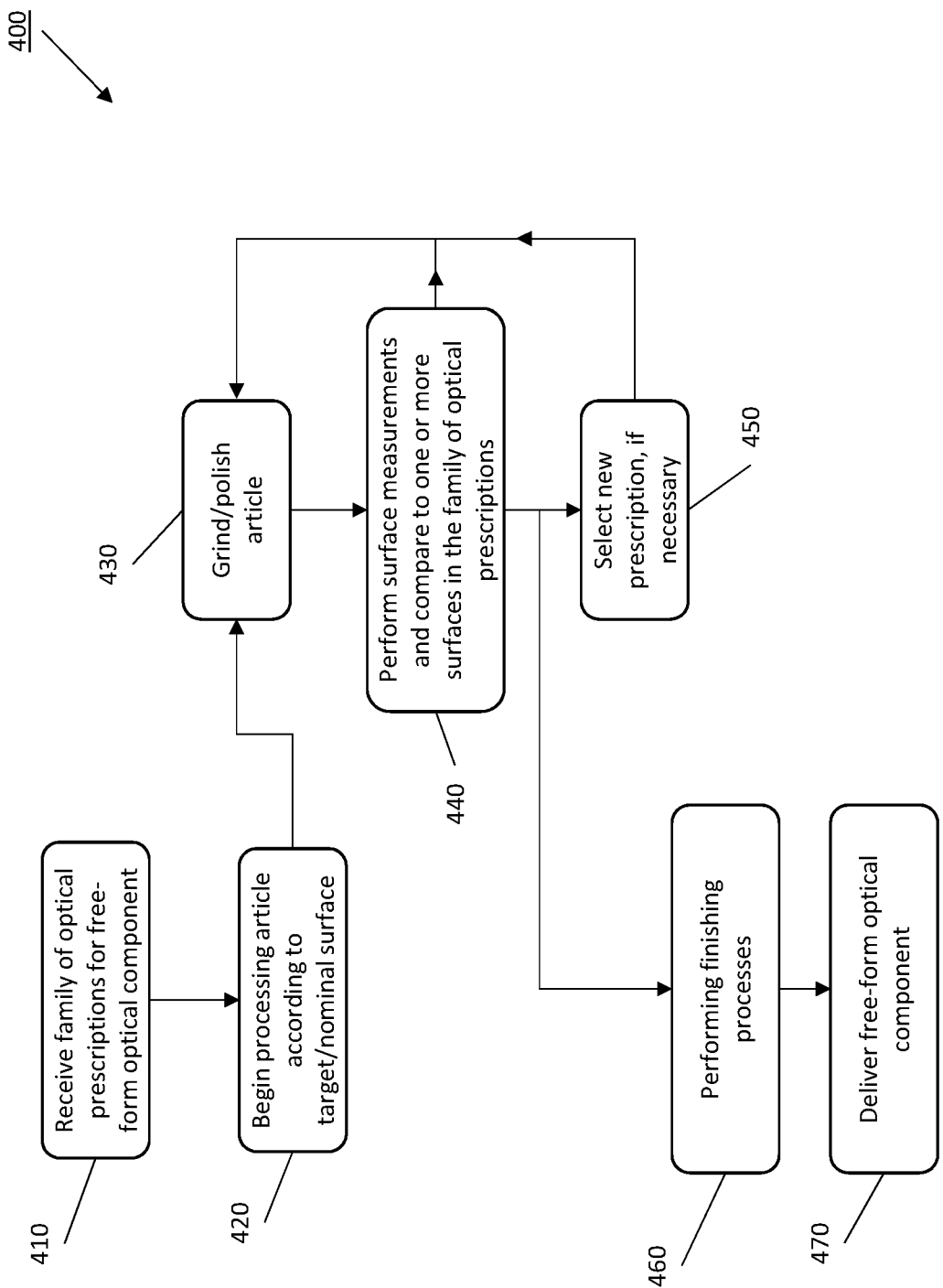
FIG. 4 is a flow diagram illustrating further aspects of an example of processes for producing free-form optical components according to aspects of the present invention.

FIGS. 3 and 4 are flow diagrams illustrating an example of design and fabrication processes based on the above-discussed concepts. It is to be appreciated that the steps shown in FIGS. 3 and 4 need not be performed in the order shown or described, and may be altered in accord with routine practices followed by those skilled in the art.

Referring to FIG. 3, in one embodiment, a process 300 of designing and specifying a free-form optical component may include a step 310 of designing the optical component to produce an optical prescription corresponding to the target/nominal surface 110. The target optical prescription can be generated using optical ray tracing software, as known to those skilled in the art, based on design parameters. The process of producing an optical prescription for a given optical design using available software is known and understood by those skilled in the art, and is therefore not described in further detail herein. The process 300 may then include step 320 of producing a family 100 of optical prescriptions to ease fabrication constraints and improve the probability of achieving a specified component. As discussed above, each optical prescription in the family 100 may define a variation of the optical component that achieves the desired optical performance in the optical system for which it is intended to be used and meets various other operating conditions, such as being within an allowable tolerance range of shape for a conformal component and/or having a minimum thickness necessary to meet structural specifications. The family 100 of optical prescriptions may be similarly generated using optical ray tracing software as discussed above. Each optical prescription in the family 100 may also include various tolerances on parameters, including, but not limited to the thickness of the optical component at various points over the surface, optical power, surface slope or curvature, tilt, or decenter.

In certain example, the step of producing the family 100 of optical prescriptions may include selecting and/or defining certain parameters that set conditions on the family of optical prescriptions. For example, a number of optical prescriptions to be included in the family 100 may be specified (step 322). In certain example, providing a larger family of optical prescriptions may offer the manufacturer of the optical component more flexibility and increase the likelihood of a compliant part being produced quickly; however, a trade-off may be the time and/or computing resources needed to generate multiple optical prescriptions for the optical component. Accordingly, the number of optical prescriptions included in any given family 100 may be chosen based on various factors. For certain optical components, such as those with particularly complex shapes, for example, or where a short manufacturing lead-time is critical, a family 100 containing a higher number of optical prescriptions may be produced in step 320 than for other optical components.

In certain examples, the family 100 of optical prescriptions can be produced in part by specifying one or more "step deltas" between subsequent surfaces in the family. For example, as discussed above, the polynomial coefficients for each surface are specified relative to a vertex position. Accordingly, in step 326, a new vertex position can be specified for each surface in the family of optical prescriptions. In some examples, the new vertex position may be specified in terms of an offset amount or delta relative to the vertex position specified in the optical prescription corresponding to the target surface 110. For example, it may be specified that each new vertex position is 10 micrometers (or some other value) from the original vertex position in the z-dimension (thickness dimension). In other examples, (alterative or in addition to specifying the vertex offsets), a minimum and/or maximum thickness delta 120 between successive surfaces in the family 100 may be specified (step 328).

As discussed above, there may be a minimum thickness, overall and/or at any given point over the surface, for the optical element that is needed to meet optical performance specifications and/or structural or mechanical requirements. Accordingly, the design process 300 may include a step 324 of specifying a minimum thickness allowed for the thinnest variation included in the family 100 (surface 115 in the example shown in FIG. 1).

Once the family 100 of optical prescriptions has been produced based on the various optical and mechanical constraints for any given optical component and/or system, the information can be produced in a format that can be provided to a manufacturer or supplier to allow the optical component to be fabricated. In certain examples, step 330 includes producing a computer file containing the optical prescription information that can be delivered to the manufacturer and used to drive equipment, such as grinding and polishing machinery, used to fabricate the optical component.

Referring to FIG. 4, a free-form optical component may be fabricated based on the family of optical prescriptions and surfaces produced according to the process 300 discussed above with reference to FIG. 3. In step 410, a manufacturer may receive the family 100 of optical prescriptions for a free-form optical component to be made. In certain examples, step 410 may include receiving the computer file produced in step 330 discussed above. In other examples, the family 100 of optical prescriptions may be provided in another format. As discussed above, the family 100 of optical prescriptions includes a prescription specifying a target or nominal surface 110 for the optical component. Accordingly, in step 420, the manufacturer may begin fabricating the optical component according to the specifications for the target surface 110. As discussed above, fabricating the free-form optical component may include a series of grinding and polishing steps 430. For example, a starting block of the desired material (a "blank") may be ground or otherwise processed to approach a rough approximation of the target surface 110, at which point more precise steps 430 of grinding and/or polishing can be performed to remove material from the blank and work the article towards the target surface shape. At intervals during the process, measurements can be taken of the article to determine how close the article is to the desired final form (step 440). These measurements may include measurements of the surface thickness and/or roughness at many points over the surface of the article. In step 440, the measurement data can be compared to the target surface 110 to determine whether the article is within the specified tolerance range of all the parameters set forth in the corresponding optical prescription.

The steps 430 of grinding and/or polishing and 440 of measuring the surface of the article and comparing it to the desired target can be repeated multiple times. If no error occurs, at some point sufficient processing will have occurred such that the article meets the specifications of the target surface 110, and can be sent for final finishing (step 460) to produce the optical component. However, as discussed above, due to the complexity of many free-form optical components and the deterministic nature of the process, in at least some instances, the measurements in step 440 may reveal that too much material has been removed in one of the steps 430 at one or more points over the surface of the article, such that the article cannot be finished to within the tolerances specified for the target surface 110. Accordingly, step 440 may further include comparing the measurement data to the family 100 of optical prescriptions to determine whether the article can continue to be worked toward one of the other surfaces specified in the family. In certain examples, the complete set of optical prescriptions in the family can be loaded into a computer, and the measurement data can be compared to all the family-member optical prescriptions (simultaneously or sequentially) in one operation. In other examples, the measurement data can be compared to selected ones of the family-member optical prescriptions individually, although the former approach may be more efficient. In certain example, a "best fit" analysis or other technique may be applied to select an optimal optical prescription from the family 100 on which to base continued processing of the article based on the current state of the article as described by the measurement data. Thus, in step 450, a new optical prescription may be selected from the family 100, and further step(s) 430 can be performed to continue working the article toward to new specifications. Steps 430, 440, and 450 may be repeated until the article conforms to the specifications (and tolerances) set forth in at least one of the optical prescriptions in the family 100 and is ready for final finishing. Thus, referring again to FIG. 1, using this process, a manufacturer may start working toward the target/nominal surface 110, but may progressively select thinner surfaces 111, 112, 113, 114, or 115 if a thickness tolerance for any preceding surface is overshot during the grinding or polishing procedures. This approach thus affords the manufacturer the ability to select the final surface shape for the optical component based on the series of optical prescriptions in the family, providing far greater room for error and recovery than conventional methods.

Referring again to FIG. 4, when the article meets the specifications of at least one of the optical prescriptions in the family 100, final finishing steps 460 can be performed to produce the final free-form optical component that can be delivered for use (step 470). Steps 460 may include final polishing (e.g., using single-point diamond turning and/or other precision polishing techniques) to smooth the surface of the free-form optical component to optical quality (typically specified in terms of maximum or RMS surface roughness), and optionally applying one or more coating steps. For example, certain free-form optical components may be coated with anti-reflective coatings; others may have mirrors coatings, or other types of coatings applied, depending on the application/system in which the free-form optical component is to be used.

Thus, aspects and embodiments provide a flexible approach to the production of free-form optical components that can enable less waste and cost and faster manufacturing times. Rather than requiring a free-form optical component to be fabricated according to a single specification with very tight tolerances, a set of optical prescriptions, each specifying an acceptable variation of the free-form optical component, is provided, such that a manufacturer can select a final surface shape of the free-form optical component from any of the variations provided. Each variation of the free-form optical component may have equivalent optical performance to the other variations, within a specified tolerance, such that any of the variations of the free-form optical component may be used in the system/application for which the free-form optical component has been designed. As discussed above, because the free-form optical components are typically fabricated using material removal steps, the set of optical prescriptions can include a target or nominal prescription, followed by a series of optical prescriptions that specify progressively thinner variations of the free-form optical component. Each optical prescription in the set may specify a certain tolerance range for various parameters, including thickness. In certain examples, the set of optical prescriptions can be configured such that the tolerance ranges at least partially overlap from one prescription to the next in a progressive series, providing a smooth transition from one variation of the free-form optical component to the next. Providing this set of optical prescriptions reduces the consequences of exceeding a thickness tolerance during a processing step, allowing the components to be fabricated more quickly and reducing the waste, and cost, associated with parts that fail the specifications of one optical prescription but nonetheless can be recovered to meet the specifications of another, essentially performance-equivalent, optical prescription. The approach may be applied to the fabrication of any free-form optical design, including, but not limited to, domes, corrector arches, other corrector shapes, and a wide variety of other components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Thus, the foregoing description and drawings are by way of example only, and the scope of the invention should be determined from proper construction of the appended claims, and their equivalents.

What is claimed is:

1. A method of fabricating a free-form optical component, the method comprising:
   receiving a set of optical prescriptions specifying a plurality of variations of a surface figure of the free-form optical component, the set of optical prescriptions including a target optical prescription and a series of additional optical prescriptions, each optical prescription in the set corresponding to one of the plurality of variations of the surface figure of the free-form optical component;
   processing an article by a plurality of material removal steps to work the article to approach a variation of the surface figure of the free-form optical component specified by the target optical prescription;
   measuring characteristics of the article to obtain first surface measurement data for the article;
   comparing the first surface measurement data to the variation of the surface figure of the free-form optical component specified by the target optical prescription;
   responsive to determining, based on the comparing, that the article does not meet specifications of the target optical prescription, selecting an additional optical prescription from the series of additional optical prescriptions; and
   processing the article by one or more further material removal steps to work the article to approach a variation of the surface figure of the free-form optical component specified by the selected additional optical prescription.

2. The method of claim 1 wherein measuring the characteristics of the article includes measuring a thickness of the article at a plurality of points along a surface of the article.

3. The method of claim 2 wherein determining that the article does not meet the specifications of the target optical prescription includes determining that the thickness of the article at one of the plurality of points along the surface of the article is thinner than a minimum thickness set by the target optical prescription.

4. The method of claim 3 wherein each additional optical prescription in the series of additional optical prescriptions defines a variation of the free-form optical component that is thinner than a variation of the free-form optical component defined by the target optical prescription.

5. The method of claim 1 further comprising:
   after processing the article by the one or more further material removal steps, measuring the characteristics of the article to obtain second surface measurement data for the article; and
   comparing the second surface measurement data to the variation of the surface figure of the free-form optical component specified by the selected additional optical prescription.

6. The method of claim 5 wherein measuring the characteristics of the article includes measuring a thickness of the article at a plurality of points along a surface of the article.

7. The method of claim 1 wherein processing the article by a plurality of material removal steps includes grinding and polishing the article.

* * * * *